(12) United States Patent
Kenvin et al.

(10) Patent No.: US 11,874,155 B2
(45) Date of Patent: Jan. 16, 2024

(54) SYSTEMS AND METHODS FOR GAS PYCNOMETER AND GAS ADSORPTION ANALYZER CALIBRATION

(71) Applicant: Micromeritics Instrument Corporation, Norcross, GA (US)

(72) Inventors: Jeff Kenvin, Roswell, GA (US); Kyle Mascaritolo, Peachtree Corners, GA (US); John McCaffrey, Duluth, GA (US)

(73) Assignee: Micromeritics Instrument Corporation, Norcross, GA (US)

( * ) Notice: Subject to any disclaimer, the term of this patent is extended or adjusted under 35 U.S.C. 154(b) by 0 days.

(21) Appl. No.: 17/729,058

(22) Filed: Apr. 26, 2022

(65) Prior Publication Data

US 2022/0349743 A1    Nov. 3, 2022

Related U.S. Application Data

(60) Provisional application No. 63/180,692, filed on Apr. 28, 2021.

(51) Int. Cl.
*G01F 25/00* (2022.01)

(52) U.S. Cl.
CPC .................. *G01F 25/0084* (2013.01)

(58) Field of Classification Search
None
See application file for complete search history.

(56) References Cited

U.S. PATENT DOCUMENTS

| | | | |
|---|---|---|---|
| 4,699,002 A * | 10/1987 | Rockley | E21B 49/005 73/32 R |
| 5,004,590 A | 4/1991 | Schimpf | |
| 6,387,704 B1 | 5/2002 | Thomas et al. | |
| 6,595,036 B1 | 7/2003 | Nakai | |
| 2004/0036867 A1* | 2/2004 | Jedamzik | G01B 21/042 356/243.1 |
| 2004/0070120 A1* | 4/2004 | Doehring | C03C 10/0027 501/7 |
| 2017/0030817 A1* | 2/2017 | Nakai | G01N 9/02 |

OTHER PUBLICATIONS

Instruquest Inc. Scientific Instruments R&D; http://www.instruquest.com/CalibrationKit_html; Feb. 19, 2020 [retrieved on Aug. 16, 2022].
International Search Report and the Written Opinion of the International Searching Authority for PCT/US22/26266, dated Aug. 11, 2022.

* cited by examiner

*Primary Examiner* — Paul M. West
*Assistant Examiner* — Mark A Shabman
(74) *Attorney, Agent, or Firm* — Womble Bond Dickinson (US) LLP

(57) ABSTRACT

Systems and methods for calibrating a gas pycnometer utilizing a custom volume reference standard are disclosed. The custom volume reference standard may include a material. The material may include a low CTE and high-accuracy dimensions. The material may have a high-aspect ratio reference shape corresponding to an inner area of a custom made sample cup. The custom volume reference standard may include a specified number of inclusions of the material, a high purity, and/or an accurately known density. The custom volume reference standard may include a known volume.

19 Claims, 3 Drawing Sheets

FIG. 3

SYSTEMS AND METHODS FOR GAS PYCNOMETER AND GAS ADSORPTION ANALYZER CALIBRATION

CROSS-REFERENCE TO RELATED APPLICATION

This present application claims benefit of U.S. Provisional Patent Application No. 63/180,692, filed Apr. 28, 2021.

INCORPORATED BY REFERENCE

The disclosure of U.S. Provisional Patent Application No. 63/180,692, filed Apr. 28, 2021, is incorporated by reference herein for all purposes as set forth in its entirety.

TECHNICAL FIELD

In one aspect, the present disclosure is directed to systems and methods for calibration of measurement devices, and more specifically, to systems and methods for calibration of a gas pycnometer or gas adsorption analyzer (herein referred to as pycnometric device) utilizing a custom volume reference standard material with a low coefficient of thermal expansion. Other aspects also are described.

BACKGROUND

Gas pycnometers are used to non-destructively measure the volume of various materials, e.g., powders, slurries, porous materials, etc., and determine various properties thereof such as a true density of the materials being measured and similarly gas adsorption analyzers are used to nondestructively measure the quantity of fluid that may be adsorbed by powders and porous materials. However, to ensure accurate measurements and determinations of volume and densities of materials or adsorbed fluid, the pycnometric device is dependent upon being accurately calibrated using a known reference volume standard. In the past, reference volume standards have been sold that are formed for use with specific size sample cups, containers, or chamber of a particular measurement device. Typically, these reference volume standards have been formed of metals such as tungsten carbide or stainless steel and shaped as spheres so that they can be machined within desired tolerances and in specific sizes designed to match such specific size sample containers/cups. These reference volume standards are, however, typically very expensive to produce due to the necessary high degree of precision in their machining, making it difficult, and generally cost-prohibitive to provide customers with a wide variety of different sized/shaped containers, and/or customized sample measurement solutions. Still further, if such conventional reference volume standards are mishandled or damaged, e.g. dropped, so as to affect/change their dimensions or roundness even slightly, then the reference volume standard can be rendered inaccurate and will need to be replaced. In addition, the coefficient of thermal expansion (CTE) and densities of these volume reference standards also generally are relatively high; for example, tungsten carbide has a CTE of 5.5 μm/m-° C. and a density of at least 15 g/cc, while stainless steel has a CTE of 17.5 μm/m-° C., with a density of about 7.9 g/cc. The high CTE of such materials means that they tend to undergo expansion upon exposure to higher temperatures and, at least indirectly, pressure, which expansion affects the volume of the volume reference standard and therefore must be accounted for during the volume calibration.

Accordingly, the present disclosure is directed to embodiments of systems and methods for calibrating a pycnometric device that address the foregoing and other related, and unrelated, problems in the relevant art.

SUMMARY

Briefly described, the present disclosure includes systems and methods for calibrating measurement systems such as gas pycnometers or gas adsorption analyzers. In some aspects, the systems and methods may be adapted for calibrating a gas pycnometer or gas adsorption analyzer utilizing a custom shaped sample cup, secondary sample cup, container, or sample chamber. Such calibration may utilize volume reference standards formed from various materials exhibiting low coefficients of thermal expansion (CTE), and which can be produced with high dimensional accuracy and/or density accuracy to provide a volume reference standard that will have a volume that is determinable with a high accuracy so as to enable calibration of gas pycnometers that can incorporate a variety of differing size and/or configuration sample chambers. Such materials also will be producible at a substantially lower cost in comparison to conventional volume reference standard materials; and may be produced in a variety of different and/or customizable sizes and/or configurations, as well as with a known and/or low number of inclusions, a known high purity, and/or a known density, without substantially affecting a reference volume calculation thereof. Thus, by utilizing such materials, a gas pycnometer utilizing customer specified or otherwise custom configured sample cups or chambers may be accurately calibrated.

Accordingly, in one aspect, the present disclosure is directed to a method for calibrating a gas pycnometer. The method may include placing a custom volume reference standard into a sample cup or sample chamber, with the custom volume reference standard being formed from a ceramic or optical glass materials having a low coefficient of thermal expansion, for example, less than 5.5-6.0 μm/m-° C., and in embodiments, within a range of about 0.005 μm/m-° C. to about 4.5 μm/m-° C.; or 0.05 μm/m-° C. to about 3.0 μm/m-° C.; and which has a known volume with accuracies of ±0.00005" (50 microinches). The custom volume reference standard further will be formed with a configuration or reference shape dimensions adapted to substantially match the configuration or dimensions of the sample cup or container, which will be placed into the sample chamber of the gas pycnometer, and a gas introduced into sample chamber. In another embodiment, the custom volume reference standard further will be formed with a volume adapted to substantially match the volume of samples to be measured or analyzed. In such embodiments, the gas pycnometer can be operated without a sample cup or container, and the reference standard can have a selected, known shape (including known dimensions of length, width, and depth) and volume for calibration of the gas pycnometer without a sample cup or container being required. For example, the custom volume reference standard can be formed with a selected reference shape, such as, but without limitation, a disc, a cylinder, a conical shape, a frusto-conical shape, or other shape, rather than having to be formed as a sphere.

After a pressure and temperature of the gas within the sample chamber reach a pressure and/or temperature equilibrium, a first pressure of the sample chamber is measured. The gas from the sample chamber is then enabled to flow into an expansion chamber until the expansion chamber is filled, after which a second pressure of the sample chamber is measured. A volume of the custom volume reference standard is determined based on the first measured pressure and the second measured pressure after expansion of the gas. This measured volume of the custom volume reference standard is then compared to the known volume of the custom volume reference standard, and adjustments to an average calibration volume of the sample chamber will be made based on the comparison.

In embodiments, the custom reference volume standard will be composed of a material with a low CTE, such as a Lithium-Aluminosilicate Glass-Ceramic. In some embodiments, the custom volume reference standard may be composed of optical glass materials such as sapphire, silicon, and fused silica. Other ceramic, glass, and/or similar crystalline materials with a CTE less than 6 µm/m-° C., and in some embodiments, less than about 3 µm/m-° C., including crystalline materials that can be grown or lab formed in the desired custom reference shapes to match customer specified/custom sample cups or containers, also can be used. The custom volume reference standard further may include a specified number of inclusions or a high purity, which allows the density to be known to high accuracy. In another aspect, a mishandled custom volume reference standard may be re-usable after cleaning and/or re-weighing.

In another aspect, the sample cup or sample chamber may be a custom shape. The custom shape may include or have a high-aspect ratio. The sample cup or sample chamber may be configured to accept a custom volume reference standard having a variety of configurations, including, but not limited to, a thin disk, a long rod, cylinders, spheres, or other configurations. The sample cup or sample chamber may be comprised of the same low CTE material as the custom reference volume standard.

Another aspect of the disclosure is directed to a system for gas pycnometer calibration. The system may include one or more sample cups, sample chambers, or containers that can be used with a gas pycnometer, and which can be of varying sizes and/or shapes, including customer specified shapes and sizes. The system will further include one or more high-aspect ratio custom volume reference standards, each of which can be formed to match such varying or customized size and/or shape sample cups, sample chambers, or containers with high dimensional accuracy. The system will include a controller configured to calibrate a gas pycnometer utilizing the custom volume reference standard, when inserted into the sample cup, to calibrate an average volume of the gas pycnometer.

In another aspect, when the high-aspect ratio custom volume reference standard is inserted into the sample cup, the high-aspect ratio may occupy about 90% of the sample cup, sample chamber, or container.

Another aspect of the disclosure is directed to a custom volume reference standard for calibration of a gas pycnometer, which will comprise a material having low CTE and high-accuracy dimensions. The reference shape of the custom volume reference standard can be adapted to correspond to an inner area of a custom sample cup. The custom volume reference standard also may include a specified number of inclusions or be comprised of a high purity, and will have a known volume, since this may allow the density of the standard to be known to high accuracy.

Another aspect of the disclosure is directed to the calibration of devices used for determining adsorption isotherms. In particular, in embodiments, the present disclosure is directed to or provides for manometric based adsorption instruments that utilize pressure, temperature, and a calibrated volume or volumes for the determination of the volume occupied by a test material; and similarly the total quantity of a fluid, typically a vapor, that is in a calibrated volume at a known pressure and temperature. The calibration of such device may be conducted in substantially the same or similar manner to a gas pycnometer. Both the pycnometer and adsorption device require a reference volume with somewhat well-defined and thermally stable dimensions, and both devices may achieve a more precise calibration if the temperature dependence is minimized.

Another aspect of the disclosure is directed to the determination of the coefficient of thermal expansion (CTE) for known or unknown materials. A pycnometric device with a high precision calibration may be used to determine the volume displaced by a sample under a series of different test conditions. By way of example, in one embodiment, the volume of the sample displaced may be evaluated at several temperatures ranging from subambient to greater than ambient temperature; and the CTE of the sample may then be calculated from the volume displaced as a function of temperature. The CTE is calculated as a linear or volumetric change in dimension per degree of temperature change in Celsius from a reference temperature, where the reference temperature is approximately 20° C.

Another aspect of this disclosure is directed toward the use of a low CTE material as a reference standard for calibration of measurement devices requiring a precise linear displacement calibration; such as those used for permeability measurements of a packed bed, or for the determination of the density of a powder or objects packed into a powder bed, and/or which can be used for the determination of a packed bed length in a cylindrical device with a well-defined diameter. Typically, a tool steel pin or other cylindrical steel cylinder with dimensions ranging from 20 to 60 +/−0.01 mm may be used to calibrate a linear displacement device. As an example, a 50 mm long Stainless Steel 304 rod (having a CTE of $17.3 \times 10^{-6}/°$ C.), tested as a reference over the allowed instrument operation range from 10-35° C., has a length change of +0.022 mm. In such cases, the calibration precision may be improved by use of a low CTE material to minimize the effects of thermal expansion of traditional tool steel reference standards, such that the effects of possible thermal expansion on the volume calibrations of the linear displacement device can be substantially eliminated.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the various aspects and embodiments disclosed herein. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. These and other features, aspects, and advantages of the disclosure will become better understood with regard to the following descriptions, aspects, and accompanying drawings. It is to be noted, however, that the drawings illustrate only several embodiments of the disclosure and, therefore, are not to be considered limiting of the scope of the disclosure. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. The description is focused on implementations and embodiments of the teachings, and is provided to assist in describing the teachings. This focus should not be interpreted as a limitation on the scope or applicability of the teachings. So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

Figure 1A:
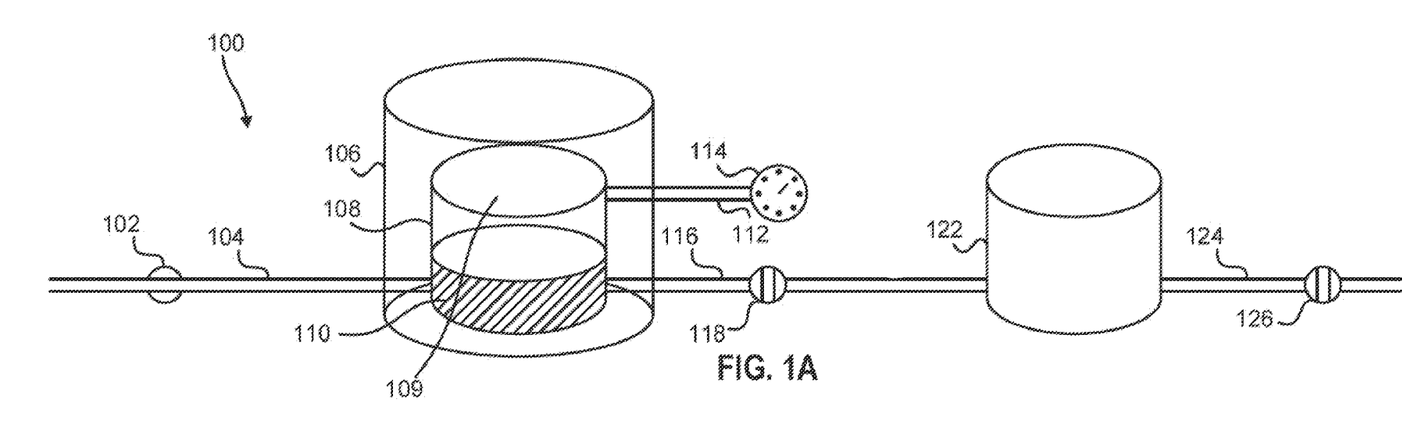
FIG. 1A and FIG. 1B are schematic diagrams of a gas pycnometer for measuring the volume and density of a material, according to the present disclosure.
Figure 1B:
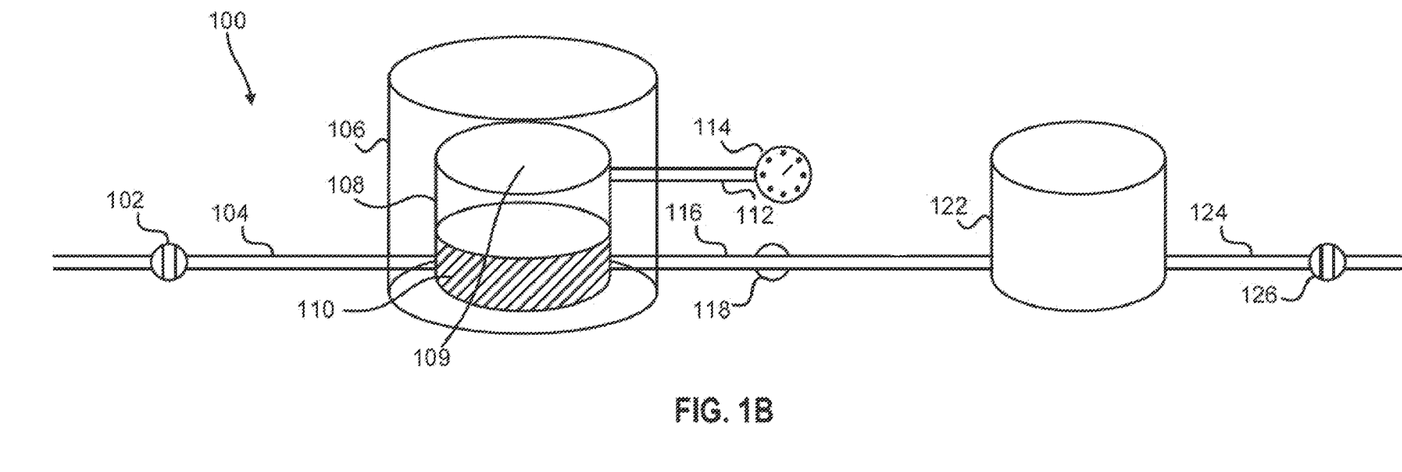

FIG. 1A and FIG. 1B are schematic diagrams of a gas pycnometer for measuring the volume and density of a material. In general, such a gas pycnometer 100 may be used to measure the volume of a material or sample 110 with a high degree of accuracy. The principles of the present disclosure are further applicable to gas adsorption analyzers or other, similar measurement devices.

By way of illustration and example, in embodiments for use of a gas pycnometer such as shown in FIGS. 1A-1B to measure the volume of a material, a sample 110 is added to a sample chamber 106 of the gas pycnometer or gas adsorption analyzer 100. In embodiments, the sample 110 will be added to a sample cup 108 that is placed in a sample chamber 106. It will, however, be understood by those skilled in the art that a sample cup or other container does not necessarily have to be used, and the sample can be tested by placing it directly within the sample chamber without a sample cup. In yet other embodiments, along with a sample cup, a secondary sample cup may be utilized. If a sample cup 108 is utilized, once the sample cup 108 is placed into the sample chamber 106 or once the sample 110 is placed directly in the sample chamber 106, valve 102 is opened (FIG. 1A) to allow gas to flow through pipeline 104 into the sample chamber 106. The pipeline 104 may also be referred to as piping or tubing. Once the sample chamber 106 is filled, and the pressure and temperature in the sample chamber 106 have reached equilibrium, measurements of pressure and temperature are taken. The pressure may be determined via a pressure transducer or pressure gauge 114 connected to and/or in fluid communication, via pipeline 112, with the sample cup 108 or sample chamber 106. The temperature can be measured via thermocouple (not shown) or similar measurement. After initial values for temperature and pressure are determined, valve 102 may be closed and valve 118 may be opened (FIG. 1B), allowing the gas to flow through pipeline 116 to an expansion chamber 122.

The expansion chamber 122 is monitored as it is filled with the gas from the sample chamber 106. Once the expansion chamber 122 is filled, and pressure and temperature have come to equilibrium, a second measurement of sample chamber 106 is determined, e.g., via the pressure transducer or pressure gauge 114. Utilizing the measurements of the first pressure and the second pressure, a controller of the gas pycnometer may determine the actual volume of the sample material.

Figures 2A, 2B:
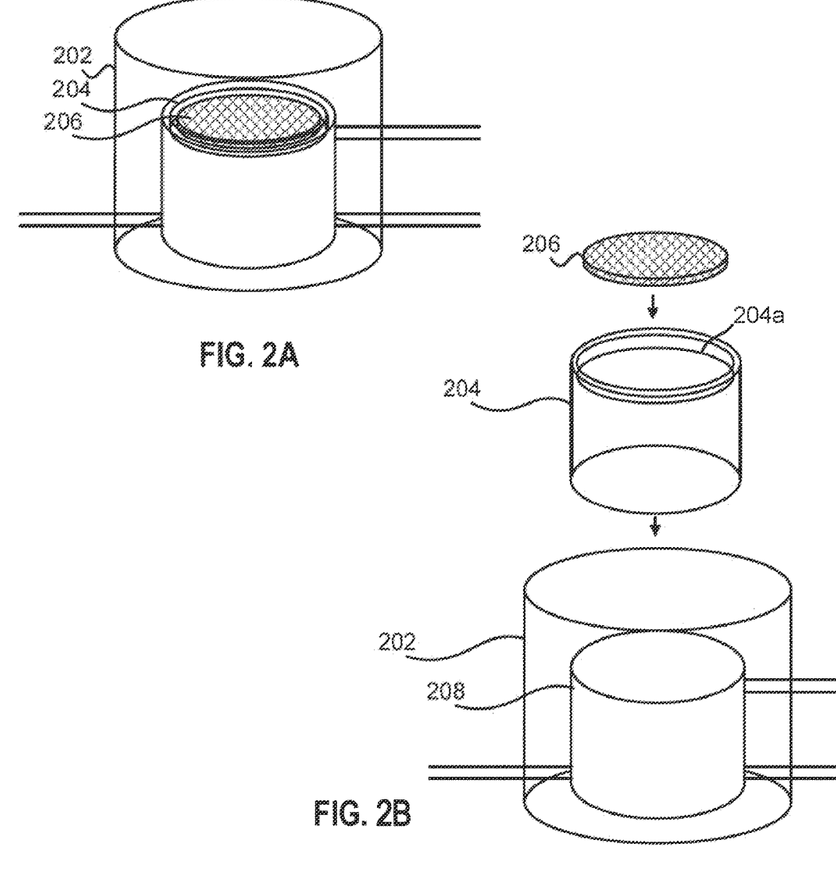
FIG. 2A and FIG. 2B are schematic diagrams of a sample chamber of a gas pycnometer including a custom volume reference standard, according to the present disclosure.
Figure 2C:
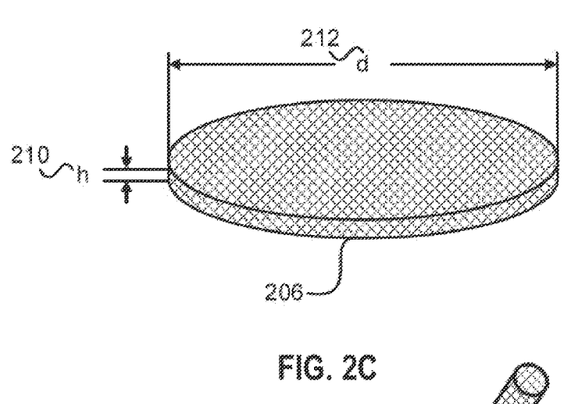
FIG. 2C is a schematic diagram of the custom volume reference standard of FIG. 2A and FIG. 2B.

As noted, prior to use, to accurately calculate the volume of a material sample, the gas pycnometer 100, must be calibrated using a volume reference standard. The volume reference standard may be a solid object; and will have a known volume, known mass, and/or known density. In the past, spherical volume reference standards composed of tungsten carbide or stainless steel have been used. However, such volume reference standards composed of tungsten carbide or stainless steel have been costly to produce and possess a high CTE such that they tend to expand significantly under higher temperatures and, at least indirectly, pressure (e.g., an increase in pressure causing a further increase in temperature), which expansion must be allowed to stabilize and must be accounted for in calibrating the volume of the sample chamber. Further, creating custom volume reference standards with shapes other than spheres, for example, but not limited to, thin disks, as illustrated in FIGS. 2A through 2C, cylinders, rods, stackable materials or other shaped standards of dense, hard materials such as tungsten carbide or stainless steel is difficult, costly, and such volume reference standards could be easily damaged. Thus, customer demands/desires for greater variations in the sizes and shapes of sample chambers, which in turn requires more customization of volume reference standards, have generally been limited and/or have gone substantially unmet.

In an embodiment, the gas pycnometer 100 or a custom sample cup of the gas pycnometer 100 may include or be included with a custom volume reference standard. The custom volume reference standard may correspond, in shape and size, to the indention in the custom sample cup or may correspond or be similar to, in size and/or volume, to samples to be measured or analyzed. The custom volume reference standard may be composed of a low CTE material. The custom volume reference standard may be produced in a variety of reference shapes and sizes. The reference shapes and sizes may be produced at high levels of dimensional accuracy (e.g. with shape dimensions accurate to approximately 1 micrometer to approximately 1.0 millimeter although greater or lesser dimensional accuracies also can be used). For example, a custom volume reference standard may be produced at an accuracy of +50 microinches in relation to the diameter and thickness of the custom volume reference standard. Further, the custom volume reference standard may be polished such that it may be assumed that deviations from flatness and smoothness are negligible. Based on such characteristics, a resulting volume uncertainty may be ±0.00016 cm$^3$ to ±0.00092 cm$^3$. Such a low-CTE material may experience a small amount of thermal expansion, based on the low-CTE qualities of the low-CTE material, offering a stable custom volume reference standard able to withstand high heat. The low-CTE material may also be low cost, in comparison to the cost of tungsten carbide or stainless steel.

FIG. 2A and FIG. 2B are schematic diagrams of a sample chamber 202 of a gas pycnometer including a custom volume reference standard 206 (FIGS. 2A-2C), according to the present disclosure. In accordance with embodiments of the present disclosure, as different and/or custom sample cups 204 or chambers are utilized, the volume reference standards for calibration of gas pycnometers utilizing such different, custom designed sample cups or chambers may be customized, e.g., such as custom reference standard 206. In particular, the custom volume reference standards of the present disclosure will include materials such as ceramic based materials, glass materials, or other types of materials, including various optical crystalline structured materials, which possess a low CTE, as well as offering a cost effective production/formation with high accuracy dimensions on all sides of any reference shape desired. Materials used to create the custom volume reference standard 206 may include sapphire materials, silicon or singe crystal silicon, fused silica, borosilicate, titania-silicate glass (e.g. Corning® ULE® Glass (Ultra-Low Expansion Glass), and/or lithium-aluminosilicate glass-ceramic (e.g., Zerodur®). Other materials exhibiting similar characteristics may be utilized. Such custom volume reference standard materials can be formed as sheets, cut and polished to size and/or shape, or can be grown as crystalline structures and polished.

In such examples, a gas pycnometer having a customer specified custom sample cup 204 or chamber may be utilized. By way of example, in one embodiment, a custom sample cup 204 may be configured with a thin disk-shaped indentation 204a (FIG. 2B) to hold various samples. Various other shapes may be desired for the custom sample cup's indentation. Further, the custom sample cup 204 may be comprised of the same material (e.g., a low CTE material) as the custom volume reference standard 206. To calibrate the gas pycnometer, a thin disk-shaped custom volume reference standard 206 may be utilized. Other reference shapes may be considered for the custom standard reference, based on the shape of the custom sample cup's indentation shape and/or based on shapes or volumes of samples to be measured or analyzed. As shown in FIG. 2B, the custom volume reference standard 206 may be inserted or placed into the indentation 204a of the custom sample cup 204, the custom sample cup 204 may then be placed or inserted into a sample chamber 202, and a combination process may be conducted as discussed above.

The thin disk-shaped custom volume reference standard 206 will include a material, as noted above, having a CTE that will be less than about 5.5 μm/m-° C., and will be constructed to occupy up to 90% of the custom sample cup 204. Since the CTE of such a custom volume reference standard 206 will be low, as a hot gas flows into the sample chamber 202 or sample cup 204, the custom standard reference 206 may exhibit minimal thermal based expansion. Further, temperature of the custom volume reference standard 206 may not be an issue, due to such properties. In embodiments, the CTE of such a custom volume reference standard 206 may be about 0.005 to about 5.5-6.0 μm/m-° C.; about 0.007 μm/m-° C. to about 4.5 μm/m-° C.; about 0.007 μm/m-° C. to about 4.0 μm/m-° C.; 0.05 μm/m-° C. to about 4.0 μm/m-° C.; 0.05 μm/m-° C. to about 3.5 μm/m-° C.; 0.005 μm/m-° C. to about 3.0 μm/m-° C.; 0.05 μm/m-° C. to about 2.5 μm/m-° C.; or other variations. For example, materials such as lithium-aluminosilicate glass-ceramic can have a CTE of about 0.007 μm/m-° C. to about 0.05 μm/m-° C., fused silica materials can have a CTE of about 0.6 μm/m-° C., silicon and/or single-crystal silicon materials can have a CTE of about 2.6 μm/m-° C., while sapphire crystal materials can have a CTE of about 5 to about 7 μm/m-° C. See table 1 for additional details and a comparison of the described custom volume reference standard materials with conventional volume reference standard materials.

TABLE I

| Material | CTE (μm m$^{-1}$ K$^{-1}$) | Thermal Conductivity (W m$^{-1}$ K$^{-1}$) | Density (g/cc) | Specific Heat Capacity (J g$^{-1}$ K$^{-1}$) |
|---|---|---|---|---|
| 304 Stainless Steel | 16-18 | 14-17 | 7.85-8.06 | 0.49-0.53 |
| 316 Stainless Steel | 16-18 | 16.2 | 7.9 | 0.50 |
| Tool steel | 10.5-11.0 | 20.9-32 | 7.7-8.2 | 0.42-46 |
| Tungsten Carbide | 4.5-7.1 | 28-88 | 15.25-15.88 | 0.18-0.29 |
| Sapphire | 5-7 | 12-46 | 3.98 | 0.65 |
| Borosilicate glass | 3.3 | 1.14 | 2.23 | 0.83 |
| Silicon (single crystal) | 2.6 | 157 | 2.3290 | 0.168 |
| Fused Silica | 0.6 | 1.38 | 2.2 | 0.74 |
| Lithium-Aluminosilicate Glass-Ceramic | 0.007-0.050 | 1.46 | 2.53 | 0.80 |

The custom volume reference standard 206 also may include or be formed with a reference shape other than the disk shape shown. For example, the custom volume reference standard 206 may be a spherical shape, an elliptical shape, an obround shape, a conical shape, a frusto-conical shape, and/or any other reference shape which may fit within the custom sample cup 204 or sample chamber 202 and fill a sufficient space within the custom sample cup 204 or sample chamber 202. Further, the custom volume reference standard 206 may exhibit little to no damage if mishandled, as opposed to tungsten carbide or stainless steel. For example, since the custom standard is constructed with a selected low CTE, it's density generally can be considered a constant within a given temperature range, and therefore, as the mass of the custom reference standard is known, if the custom volume reference standard 206 is mishandled, e.g., touched without gloves or dropped, rather than disposing of the custom volume reference standard 206, the custom volume reference standard 206 may be cleaned or polished and/or re-weighed and use of the custom volume reference standard 206 may be continued. In addition, some of the materials selected for the construction of the custom volume reference standard (e.g., Zerodur) are specified with a very low number of inclusions, meaning the density is substantially constant throughout the object.

Various other custom sample cups may be specified, other than the custom sample cup 204 illustrated. Such shapes may include different sized disk shaped areas, portions or indentations, as well as long thin vertical rod or cylindrical shaped areas, portions, or indentations. As a user specifies a custom shaped sample cup, a corresponding custom volume reference standard with a selected reference shape configured to fit within the custom shaped sample cup may be created for calibration purposes.

Figure 2D:
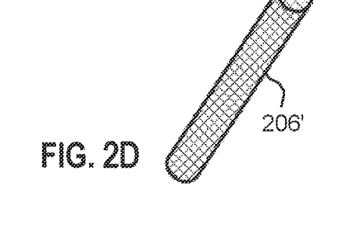
FIG. 2D and FIG. 2E are schematic diagrams of exemplary custom volume reference standards having alternative shapes, according to the present disclosure.
Figure 2E:
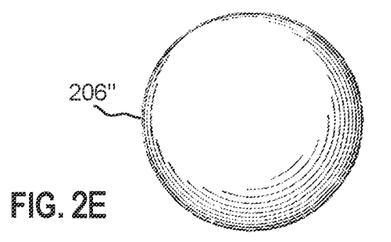

As the custom sample cup 204 may include a thin or shallow indentation or a long thin vertical rod or cylindrical shaped area configured to receive a sample, to perform an accurate calibration the custom volume reference standard 206 may be a high-aspect ratio reference shape. As used herein, "high-aspect ratio" or "high-aspect ratio reference shape" may refer to the ratio of different dimensions of a reference shape. Such ratios may include one dimension being several times more than the other dimension utilized in the ratio. For example, an aspect ratio of a cylinder or disk may be represented as the height (h) 210 of the cylinder or disk divided by the diameter (d) 212 of the cylinder or disk, e.g., h:d. A high-aspect ratio cylinder or disk may include a cylinder or disk with a height several times larger than the diameter of the cylinder or disk or a diameter several times larger than the height of the cylinder or disk, e.g., 3 times larger, 4 times larger, 5 times larger, or more. The custom volume reference standard may be produced in various sizes and/or forms. For example, an alternative custom volume reference standard 206' having a cylindrical or rod shape (e.g., with a high-aspect ratio) is shown in FIG. 2D, and an alternative custom volume reference standard 206" having a spherical shape is shown in FIG. 2E.

As noted, to properly calibrate a pycnometer, such a custom volume reference standard may be of a known volume and include a high level of dimensional accuracy. For example, the custom volume reference standard may be produced with accuracies of 50 microinches on the diameter and thickness. Further, the custom volume reference standard may be polished until flat and smooth. Such polishing may allow for deviations, e.g., unevenness and/or roughness, in the surface of the custom volume reference standard to become negligible. Such production methods may result in a volume uncertainty of ±0.00016 cm$^3$ to ±0.00092 cm$^3$.

Creating the custom reference shapes, e.g., high-aspect ratio reference shapes, from tungsten carbide or stainless steel is difficult and costly, and achieving high dimensional accuracy is generally an expensive procedure in common calibration materials such as metals. The alternative low-CTE materials used for the custom volume reference standard, e.g., such as sapphire materials, silicon or singe crystal silicon, fused silica, and/or lithium-aluminosilicate glass-ceramic, may offer faster, less difficult, and/or highly accurate manufacture, thus lowering the cost of the custom volume reference standard. Since the custom volume reference standard has a designed low CTE, it's density can be considered a constant within a given temperature range such that only the mass thereof is needed to know the volume. This means that the dimensional accuracy of the object is not necessarily required for volume calculation. Additionally, optical glass surfaces are normally made and tested to higher finesse than metal objects, and tolerances for surface-finish quality for typical glass surfaces can range from 5 nm RMS (typical quality) to 2 nm RMS (precision quality) to 0.5 nm RMS (high quality) versus a high quality metal surface finish of RMS 28 nm (ISO Grade N1 roughness).

The custom volume reference standard also may include a known number or amount of inclusions or be comprised of a known high purity (e.g., of a high level of homogeneity). By way of example, an inclusion generally can be defined as any air bubble with diameter >300 um, although other diameters/variations also can be used. The inclusions and purity may relate to a density of the custom volume reference material. Thus, if the number of inclusions or purity is known, the density may be known or determined with a high accuracy. Such inclusions may affect any volume measurement, potentially providing for a calibration that is not accurate. Some materials may not be considered based on such inclusions. For some of the potential materials, during manufacture, the number of maximum inclusions may be specified. Other materials may be pure and include no or few inclusions. Example materials can include silicon, graphite and diamond, and other carbon lattice materials, and materials that form crystalline structures. Class 0 Zerodur is specified to have an average of 1 inclusion per 100 cm3.

Based on such purities, it is expected that weighing such custom volume reference standards 206 may directly translate to a known density and thus a volume with a very high accuracy. Further, such materials may be produced in such reference shapes faster and more accurately than those other materials.

Figure 3:
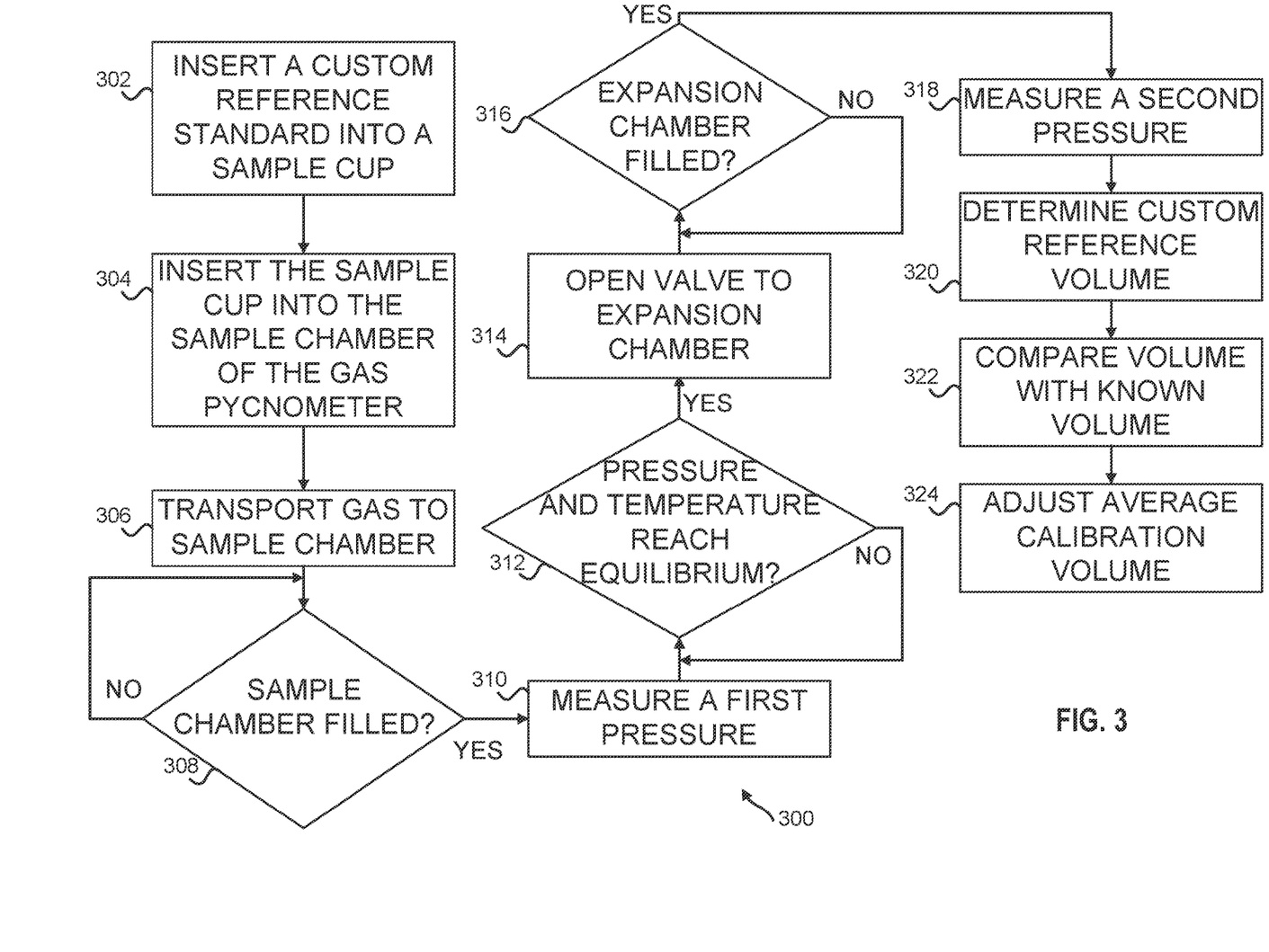
FIG. 3 is a flow diagram of processes as performed to calibrate a gas pycnometer, according to the present disclosure.

FIG. 3 is a flow diagram of processes as performed to calibrate a gas pycnometer, according to the present disclosure. Method 300 may be implemented in a computing device or controller of a gas pycnometer. Components of FIGS. 1A through 2B may be utilized in such a method 300. Unless otherwise specified, the actions of method 300 may be completed within the gas pycnometer. Specifically, method 300 may be included in one or more programs, protocols, or instructions loaded into memory of a computing device or controller of the gas pycnometer. The order in which the operations are described is not intended to be construed as a limitation, and any number of the described blocks may be combined in any order and/or in parallel to implement the methods.

As used herein, a "computing device" may refer to an electronic device including or connected to one or more processors and non-transitory machine-readable storage medium, e.g., including, but not limited to, a controller, a desktop computer, a microcontroller connected to memory, a server, an edge server, a processor and memory of a gas pycnometer, or other devices, as will be understood by those skilled in the art. As used herein, a "non-transitory machine-readable storage medium" or "memory" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory may store or include instructions executable by the processor. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), application specific integrated circuit (ASIC), other electronic circuitry suitable for the retrieval and execution instructions stored on a machine-readable storage medium, or a combination thereof.

At block 302, a custom shaped volume reference standard may be inserted into a sample cup. The custom shaped volume reference standard may be based on a custom shaped sample cup. For example, the custom shaped volume reference standard may be a flat thin disk, long thin rod, and/or other custom reference shapes not typically used in a gas pycnometer. In such examples, the custom shaped volume reference standard may correspond to an inner area or portion of the custom shaped sample cup. In another example, a user may specify a shape for a sample cup, based on the material the user may desire to measure. Based on the specifications for the sample cup, a custom shaped volume reference standard may be created and included, separate and not within, with the sample cup. In other words, when a customer receives such a gas pycnometer, the custom shaped sample cup and custom shaped volume reference standard may be contained in separate protected packages to prevent damage. Further, the sample cup or a sample chamber may be comprised of a material from user or customer selected specifications. In other embodiments, the material may be a metal or may be the same material as the custom shaped volume standard. In an example, utilizing the same low CTE material for the sample cup or sample chamber as that of the custom volume reference standard may eliminate or reduce any influence of the sample cup on the measured volume over temperature. In embodiments, the custom shaped volume reference standard and/or the sample cup may have any suitable shape.

At block 304, the custom shaped sample cup may be inserted into the sample chamber. A user may insert the custom shaped sample cup into the sample chamber after inserting the custom shaped volume reference standard or before inserting the custom shaped volume reference standard.

At block 306, after the custom shaped sample cup is inserted into the sample chamber and a lid of the gas pycnometer is closed or sealed, a controller or computing device of the gas pycnometer may actuate a valve and allow and/or transport gas into the sample chamber and/or custom shaped sample cup. At block 308, the controller or computing device may check or determine whether the sample chamber or custom shaped sample cup has been filled with gas. Once the sample chamber or custom shaped sample cup is filled with gas, the controller or computing device may measure a first pressure, at block 310. The first pressure may be measured via a pressure gauge or pressure transducer disposed within the gas pycnometer and in fluid communication with the sample chamber and/or custom shaped sample cup.

After the first pressure is determined, at block 312, the controller or computing device may determine if the pressure and/or temperature within the sample chamber and/or custom shaped sample cup has reached equilibrium. In such examples, the gas pycnometer may include a temperature sensor, in addition to the pressure gauge or transducer. Once the pressure and/or temperature within the sample chamber and/or custom shaped sample cup has reached equilibrium or does not exhibit further changes, then, at block 314, the controller or computing device may actuate a valve to the expansion chamber. Further, the valve to the sample chamber and/or custom shaped sample cup may be actuated to close or prevent gas from continuing to flow.

At block 316, the controller or computing device may determine whether the expansion chamber is filled. If the expansion chamber is not filled, the controller or computing device may continue to check the pressure of the expansion chamber and/or the sample chamber. After the expansion chamber has filled, the controller or computing device may measure the pressure of/at the sample chamber and/or custom shaped sample cup. After determining the second pressure, at block 318, the controller or computing device may determine the volume of the custom shaped volume reference standard at block 320. At block 322, the controller or computing device may compare the determined volume with the known volume of the custom shaped volume reference standard. Based on such the comparison, the controller or computing device may adjust the calibration volume of the gas pycnometer (block 324).

In addition, once the gas pycnometer or gas adsorption analyzer has been calibrated, it can be used for measuring a volume of additional other, known or unknown materials at multiple temperatures and determining a coefficient of thermal expansion for the additional material(s) as a function of temperature based upon test results at the multiple temperatures. The volume of the sample displaced may be evaluated at several temperatures ranging from subambient to greater than ambient temperature; and the CTE of the sample may then be calculated from the volume displaced as a function of temperature. The CTE is calculated as a linear change in dimension per degree of temperature change in Celsius from a reference temperature. By way of example only, in some embodiments, the reference temperature can be approximately 20° C.; though the reference temperature can vary depending on the material(s) being tested.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended aspects.

The invention claimed is:

1. A method for calibrating a pycnometric device, comprising:
   (a) selecting a custom volume reference standard having a known volume selected to substantially match a volume of at least one sample to be measured by the pycnometric device, wherein the custom volume reference standard is formed with a high aspect ratio reference shape and comprises a material having a low coefficient of thermal expansion (CTE), and including at least one of a lithium-aluminosilicate glass-ceramic, sapphire, silicon, fused silica, or combinations thereof;
   (b) placing the custom volume reference standard into a sample chamber of the pycnometric device;
   (c) determining a measured volume of the custom volume reference standard based on a difference in pressure of a gas introduced into the pycnometric device and a known volume of the sample chamber;
   (d) comparing the measured volume of the custom volume reference standard to the known volume of the custom volume reference standard; and (e) adjusting an average calibration volume for the sample chamber based on the comparison of the measured volume of the custom volume reference standard to the known volume of the custom volume reference standard.

2. The method of claim 1, further comprising obtaining the custom volume reference standard, and wherein the custom volume reference standard includes a specified average number of inclusions.

3. The method of claim 1, further comprising cleaning and re-weighing the custom volume reference standard to determine a new known volume of the custom volume reference standard if the custom volume reference standard is mishandled.

4. The method of claim 1, wherein placing the custom volume reference standard into the sample chamber comprises placing the custom volume reference standard into a sample cup and positioning the sample cup into the sample chamber prior to calibration.

5. The method of claim 4, wherein determining the measured volume of the custom volume reference standard further comprises:
(a) supplying the gas to sample chamber;
(b) after the sample chamber is filled with the gas, measuring the first pressure of the gas within the sample chamber;
(c) after a pressure and temperature within the sample chamber reach equilibrium, opening a valve to allow the gas to flow from the sample chamber to an expansion chamber;
(d) after the expansion chamber is filled with the gas, measuring the second pressure of the gas within the sample chamber; and
(e) determining the measured volume of the custom volume reference standard based on the first pressure, second pressure, and the known volume of the sample chamber.

6. The method of claim 1, further comprising obtaining the custom volume reference standard, and wherein the custom volume reference standard comprises an optical or ceramic material formed as a sheet or a grown crystalline structure and polished to a selected size and/or shape.

7. A custom volume reference standard for calibration of a gas pycnometer, comprising:

(a) a ceramic or optical glass material including a CTE of between about 0.007 μm/m-° C. to about 6.0 μm/m-° C.;
(b) a known density of the material and a weight of the material;
(c) a known volume selected to substantially match a volume of a selected sample material; and
(d) a selected reference shape including a known width, length, depth, or combinations thereof, and a specified number of inclusions.

8. The custom volume reference standard of claim 7, wherein the material comprises lithium aluminosilicate glass-ceramic.

9. The custom volume reference standard of claim 7, wherein the material comprises fused silica.

10. The custom volume reference standard of claim 7, wherein the material comprises single crystal silicon.

11. The custom volume reference standard of claim 7, wherein the material comprises sapphire.

12. The custom volume reference standard of claim 7, wherein the reference shape comprises a cylinder shape.

13. The custom volume reference standard of claim 7, wherein the reference shape comprises a disk shape.

14. The custom volume reference standard of claim 7, wherein the reference shape comprises a spherical shape.

15. The custom volume reference standard of claim 7, wherein the reference shape of the custom volume reference standard is selected to substantially correspond to a shape of a sample cup configured to be received within a sample chamber of a gas pycnometer for calibration.

16. The custom volume reference standard of claim 7, wherein the reference shape comprises a high-aspect ratio shape.

17. The custom volume reference standard of claim 7, wherein the specified number of inclusions of the material comprises an average number of inclusions of about 1 inclusion per 100 $cm^3$ or less.

18. The custom volume reference standard of claim 7, wherein the reference shape comprises a cylinder or disk having a diameter and a height that is at least approximately 3 times the diameter.

19. The custom volume reference standard of claim 7, wherein the material comprises lithium aluminosilicate glass-ceramic having a CTE of less than about 1.0 μm/m-° C.

* * * * *